US012166282B2

(12) United States Patent
Rodriguez De Luis et al.

(10) Patent No.: US 12,166,282 B2
(45) Date of Patent: *Dec. 10, 2024

(54) ANTENNA MODULES IN PHASED ARRAY ANTENNAS

(71) Applicant: Space Exploration Technologies Corp., Hawthorne, CA (US)

(72) Inventors: Javier Rodriguez De Luis, Kirkland, WA (US); Nil Apaydin, Kirkland, WA (US); Ersin Yetisir, Redmond, WA (US); Alireza Mahanfar, Kirkland, WA (US); Siamak Ebadi, San Francisco, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,415

(22) Filed: Jun. 29, 2023

(65) Prior Publication Data

US 2023/0344147 A1 Oct. 26, 2023

Related U.S. Application Data

(63) Continuation of application No. 17/583,654, filed on Jan. 25, 2022, now Pat. No. 11,705,640, which is a (Continued)

(51) Int. Cl.

| | |
|---|---|
| ***H01Q 1/38*** | (2006.01) |
| ***H01Q 3/26*** | (2006.01) |
| ***H01Q 21/00*** | (2006.01) |

(52) U.S. Cl.

CPC .......... *H01Q 21/0087* (2013.01); *H01Q 1/38* (2013.01); *H01Q 3/26* (2013.01); *H01Q 21/0025* (2013.01)

(58) Field of Classification Search

CPC .... H01Q 9/0421; H01Q 21/0087; H01Q 1/38; H01Q 3/26

(Continued)

(56) References Cited

U.S. PATENT DOCUMENTS

| | | | |
|---|---|---|---|
| 5,122,806 | A | 6/1992 | Julian |
| 6,819,293 | B2 | 11/2004 | De Graauw |

(Continued)

OTHER PUBLICATIONS

International Search Report and Written Opinion mailed Jun. 7, 2019, issued in corresponding International Application No. PCT/US2019/018064, filed Feb. 14, 2019, 11 pages.

*Primary Examiner* — Peguy Jean Pierre

(74) *Attorney, Agent, or Firm* — Polsinelli PC

(57) ABSTRACT

An apparatus includes a plurality of conductive structures having first sides and second sides opposite the first sides, wherein the second sides of the plurality of conductive structures are configured to be physically coupleable with a printed circuit board (PCB) of a receiver, a transmitter, or a transceiver. The first sides of the plurality of conductive structures are configured to be spaced from the PCB by a first distance when the plurality of conductive structures is physically coupled with the PCB. The apparatus includes an antenna having a first side and a second side opposite the first side. The second side of the antenna is disposed closer to the plurality of conductive structures than the first side of the antenna when the plurality of conductive structures is physically coupled with the PCB.

24 Claims, 11 Drawing Sheets

Related U.S. Application Data continuation of application No. 16/858,691, filed on Apr. 26, 2020, now Pat. No. 11,309,638.

(60) Provisional application No. 62/845,780, filed on May 9, 2019.

(58) Field of Classification Search
USPC .......................................................... 343/702
See application file for complete search history.

(56) References Cited

U.S. PATENT DOCUMENTS

| | | | |
|---|---|---|---|
| 6,917,526 B2 | 7/2005 | Ajioka et al. | |
| 7,466,287 B1 | 12/2008 | Lam et al. | |
| 9,379,437 B1 | 6/2016 | Stutzke et al. | |
| 11,309,638 B1 | 4/2022 | Rodriguez De Luis et al. | |
| 2003/0020173 A1 | 1/2003 | Huff et al. | |
| 2003/0076274 A1 | 4/2003 | Phelan et al. | |
| 2003/0151550 A1 | 8/2003 | Chen et al. | |
| 2003/0184476 A1 | 10/2003 | Sikina et al. | |
| 2008/0291101 A1 | 11/2008 | Braunstein et al. | |
| 2008/0297414 A1 | 12/2008 | Krishnaswamy et al. | |
| 2010/0007561 A1* | 1/2010 | Bucca | H01Q 23/00 343/848 |
| 2015/0381229 A1 | 12/2015 | Tzanidis et al. | |
| 2016/0336646 A1 | 11/2016 | Baek et al. | |
| 2019/0165478 A1 | 5/2019 | Jo et al. | |
| 2022/0294113 A1* | 9/2022 | Chiang | H01Q 5/385 |

* cited by examiner

ANTENNA MODULES IN PHASED ARRAY ANTENNAS

CROSS-REFERENCE TO RELATED APPLICATION

The present application is a continuation of U.S. patent application Ser. No. 17/583,654, filed Jan. 25, 2022 entitled "Antenna Modules in Phased Array Antennas", which is a continuation of U.S. patent application Ser. No. 16/858,691 filed Apr. 26, 2020, now U.S. Pat. No. 11,309,638, issued on Apr. 19, 2022 entitled "Antenna Modules in Phased Array Antennas", which claims the benefit of U.S. Provisional Patent Application No. 62/845,780 filed May 9, 2019 entitled "Antenna Modules in Phased Array Antennas", the disclosures all of which are hereby expressly incorporated by reference in their entirety.

BACKGROUND

An antenna (such as a dipole antenna) typically generates radiation in a pattern that has a preferred direction. For example, the generated radiation pattern is stronger in some directions and weaker in other directions. Likewise, when receiving electromagnetic signals, the antenna has the same preferred direction. Signal quality (e.g., signal to noise ratio or SNR), whether in transmitting or receiving scenarios, can be improved by aligning the preferred direction of the antenna with a direction of the target or source of the signal. However, it is often impractical to physically reorient the antenna with respect to the target or source of the signal. Additionally, the exact location of the source/target may not be known. To overcome some of the above shortcomings of the antenna, a phased array antenna can be formed from a set of antenna elements to simulate a large directional antenna. An advantage of a phased array antenna is its ability to transmit and/or receive signals in a preferred direction (e.g., the antenna's beamforming ability) without physical repositioning or reorientating.

It would be advantageous to configure phased array antennas having increased bandwidth while maintaining a high ratio of the main lobe power to the side lobe power. Likewise, it would be advantageous to configure phased array antennas and associated circuitry having reduced weight, reduced size, lower manufacturing cost, and/or lower power requirements. Accordingly, embodiments of the present disclosure are directed to these and other improvements in phase array antennas or portions thereof.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
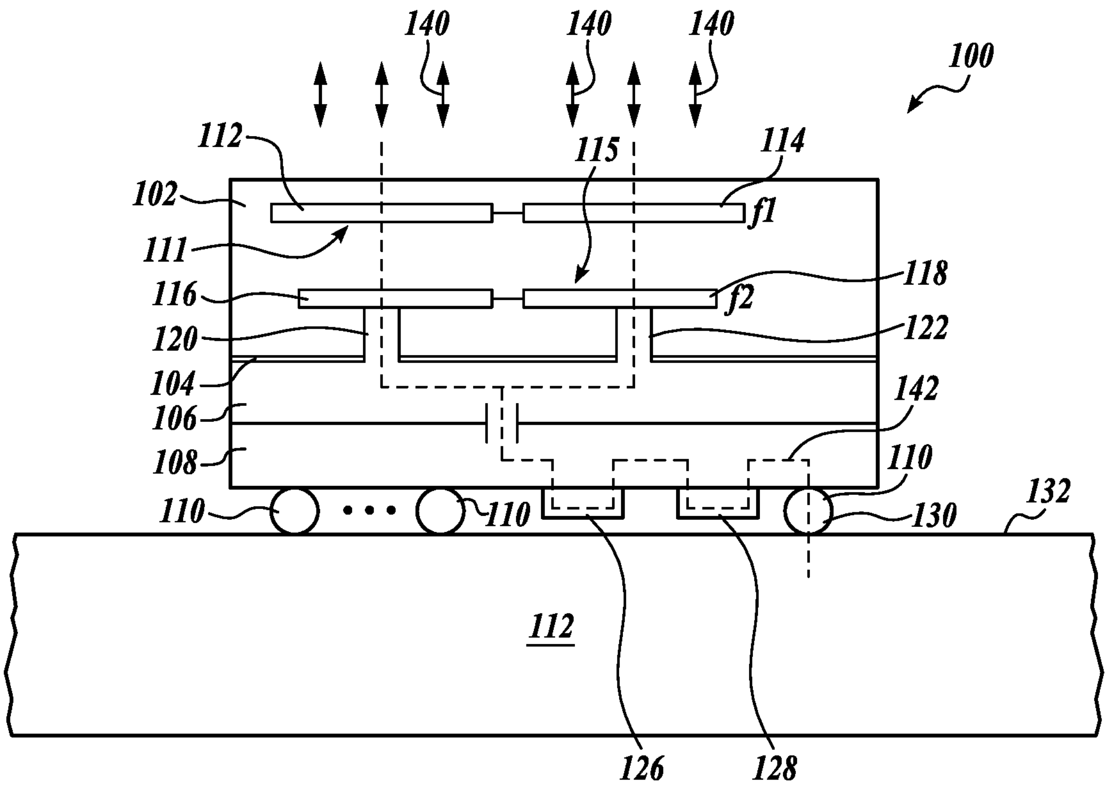
FIG. 1 is an example block diagram illustration of a cross-sectional side view of an antenna module in accordance with some embodiments of the present disclosure.

Embodiments of apparatuses and methods relate to antenna element modules in phased array antennas. In an embodiment, an apparatus includes a plurality of conductive structures having first sides and second sides opposite the first sides, wherein the second sides of the plurality of conductive structures are configured to be physically coupleable with a printed circuit board (PCB) of a receiver or a transmitter, and wherein the first sides of the plurality of conductive structures are configured to be spaced from the PCB by a first distance when the plurality of conductive structures is physically coupled with the PCB; and an antenna having a first side and a second side opposite the first side, wherein the first side comprises a radiating side of the antenna and the second side of the antenna is disposed closer to the plurality of conductive structures than the first side of the antenna when the plurality of conductive structures is physically coupled with the PCB. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface", "bottom surface", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including an organic light emitting diode (OLED) display or liquid crystal display (LCD).

FIG. 1 is an example block diagram illustration of a cross-sectional side view of an antenna module 100 in accordance with some embodiments of the present disclosure. Antenna module 100 comprises an antenna and associated electrical components and structures packaged together to be selectively physically attachable to and electrically coupleable with a printed circuit board (PCB) 112. Antenna module 100 may also be selectively physically detachable and electrically decouplable from the PCB 112. Antenna module 100 may also be referred to as an antenna in package (AIP), an AIP module, an antenna package, or the like. A plurality of antenna modules 100 are arranged in a particular arrangement to form an antenna lattice of a phased array antenna, as will be described in detail below.

In some embodiments, antenna module 100 includes an antenna layer 102, a ground plane layer 104, an intermediate layer 106, a bottom layer 108, a plurality of spacer structures 110, and a first electrical component 126, and a second electrical component 128. The ground plane layer 104 is disposed between the antenna layer 102 and intermediate layer 106. Intermediate layer 106 is disposed between the ground plane layer 104 and bottom layer 108. Bottom layer 108 is disposed between the intermediate layer 106 and the plurality of spacer structures 110. The plurality of spacer structures 110, first electrical component 126, and second electrical component 128 are disposed between the bottom layer 108 and a surface 132 of the PCB 112.

The plurality of spacer structures 110 physically and electrically couples with a side of the bottom layer 108 furthest from the antenna layer 102 or closest to surface 132. The opposing sides of the plurality of spacer structures 110 physically and electrically couples with the PCB 112. At least one of the plurality of spacer structures 110, namely a spacer structure 130, electrically couples with the PCB 112. At least some of the plurality of spacer structures 110 defines a cavity, spacing, or separation between the bottom layer 108 and surface 132. The height or distance of the cavity is equal to a height or thickness of the plurality of spacer structures 110. The height of the cavity is greater than a height or thickness of the first electrical component 126.

Each of the first and second electrical components 126, 128 is located within the cavity, physically coupled/attached to the side of the bottom layer 108 closest to surface 132, and electrically coupled with the bottom layer 108. Although not shown, in some embodiments, antenna 100 can additionally include a third electrical component located within the cavity, physically coupled/attached to the side of the bottom layer 108 closest to surface 132, and electrically coupled with the bottom layer 108. First electrical component 126, second electrical component 128, and the third electrical component comprise active electrical components. First electrical component 126, second electrical component 128, and the third electrical component can be the same or different from each other.

Antenna module 100 can include one or more additional layers such as bonding layers to adhere or physically couple/attach adjacent layers to each other, more than one ground plane layers, base layers, and/or the like.

Antenna layer 102 includes an antenna or antenna element. In an embodiment, the antenna element comprises top and bottom plates 111, 115. Top and bottom plates 111, 115 comprise conductive or metallic material. Top and bottom plates 111, 115 are overlaid over each other and separated by a certain distance from each other. Bottom plate 115 is disposed between the top plate 111 and ground plane layer 104. Major planes of the top and bottom plates 111, 115 are oriented parallel to each other, and their centers are collinear (or substantially collinear) in a direction perpendicular to the plane of surface 132.

Top and bottom plates 111, 115 may have no direct physical coupling with each other (e.g., a dielectric material may be disposed between top and bottom plates 111, 115) and instead, exhibit radiative coupling to emit radiation 140 (if configured as a transmitter antenna module) or receive radiation 140 (if configured as a receiver antenna module) at a top side of the antenna module 100 (e.g., opposite the side of the antenna module 100 that physically attaches to the PCB 112). Hence, the side of the antenna layer 102 furthest from the bottom layer 108 (e.g., the top side of antenna layer 102) comprises a radiating and/or receiving side of the antenna module 100. Top and bottom plates 111, 115 may also be referred to as top and bottom radiating elements or plates, respectively.

Top plate 111 is configured to radiate at a frequency f1 and bottom plate 115 is configured to radiate at a frequency f2 different from frequency f1. Ground plane layer 104 facilitates emission of radiation 140 in a direction away from the top side of the antenna module 100 (also referred to as uni-directional radiation or beam direction) as opposed to toward the PCB 112, for instance, and/or generation of radiation 140 having certain radiation characteristics (e.g., full bandwidth of desired frequencies, certain beam shape, certain beam direction, etc.). As an example, radiation 140 may comprise radio frequency (RF) beams.

Top and bottom plates 111, 115 can be the same or different sizes from each other (e.g., bottom plate 115 has a smaller diameter or width than top plate 111). Top and bottom plates 111, 115 can have the same or different shape as each other. In some embodiments, each of the top and bottom plates 111, 115 comprises a plurality of sections. For example, the antenna composed of the top and bottom plates 111, 115 may comprise a cross-dipole antenna, in which each of the top and bottom plates 111, 115 comprises four sections. In the cross-sectional view of FIG. 1, two of the four sections of each of the top and bottom plates 111, 115 are shown—sections 112 and 114 of top plate 111 and sections 116 and 118 of bottom plate 115. Additional details regarding cross-dipole antenna configuration will be described below. The antenna element can alternatively comprise a dipole antenna, a patch antenna, a slot antenna, a micro-strip antenna, a uni-directional antenna, or the like.

At least one conductive via extends between the bottom plate 115 and through the ground plane layer 104 to electrically couple the bottom plate 115 with a conductive trace included in the intermediate layer 106. In the case of the bottom plate 115 being part of a cross-dipole antenna, two conductive vias, namely, vias 120 and 122, extend from the bottom side of the bottom plate 115, through ground plane layer 104, to respective conductive traces included in the intermediate layer 106. Vias 120, 122 may also be referred to as antenna feeds, RF feeds, RF feed vias, feed vias, or the like. In embodiments where bottom plate 115 comprises a unitary structure, one of vias 120 or 122 may be omitted so that a single via electrically couples with the bottom plate 115. A via 124 extends between the intermediate layer 106 and bottom layer 108 to facilitate electrical coupling between the two layers.

Bottom layer 108 includes conductive traces that electrically couple with via 124, first electrical component 126, second electrical component 128, and spacer structure 130. In some embodiments, first electrical component 126 comprises an amplifier configured to power amplify a received signal—a power amplifier (PA) if the antenna module 100 is associated with a transmitter and a low noise amplifier (LNA) if the antenna module 100 is associated with a receiver. Second electrical component 128 comprises a filter configured to de-noise or otherwise filter out undesirable signal components. The amplifier (e.g., PA or LNA) is located as described above so as to reduce or minimize the signal pathway length between the antenna element of the antenna layer 102 and the amplifier.

By locating first and second electrical components 126, 128 within the antenna module 100 instead of the PCB 112, at least the signal pathway length between the antenna element included in the antenna layer 102 and the first electrical component 126 (e.g., amplifier) is reduced, thereby reducing signal degradation or distortion, signal power loss, propagation delays, and/or the like. For example, the signal pathway length between the antenna element of antenna layer 102 and the amplifier is 0.5 millimeter (mm) or less, approximately 0.25 mm, less than 2 mm, less than 5 mm, or the like. The RF transition loss between the antenna element and the amplifier is less than one decibel (dB) of an input power. The signal pathway length between the antenna element and the second electrical component (e.g., filter) also facilitates reduction of signal degradation or distortion, signal power loss, propagation delays, and/or the like. The signal pathway length between the antenna element and the filter is approximately 5 mm to 15 mm.

If a third electrical component is included in antenna module 100, then the third electrical component can comprise another amplifier (e.g., a pre-power amplifier (PPA) if the antenna module 100 is associated with a transmitter or a second LNA if the antenna module 100 is associated with a receiver); a phase shifter, if the phase shifter is configured to only support an individual antenna element; a digital beamformer, if the digital beamformer is configured to only support an individual antenna element; if antenna module 100 is associated with a transceiver, a switch to select between transmitter or receiver configurations; up converter; down converter; mixer; analog-to-digital converter (ADC); digital-to-analog converter (DAC); RF circuitry; antenna associated circuitry; passive electrical elements (e.g., inductors, capacitors, resistors, ferrite beads, etc.); and/or one or more other electrical components associated with transmission and/or receipt of radiation 140. If there little or no noise such that a filter may be omitted, then the second electrical component 128 can comprise any of the components described above for the third electrical component. Each of the first and second electrical components 126, 128 and the third electrical component comprises an integrated circuit (IC) chip.

In some embodiments, functionalities described above for first and second electrical components 126, 128 may be performed in a single electrical component, for example, and the third electrical component may be located where the second electrical component 128 is depicted. These and other variations are contemplated in embodiments of the present disclosure.

The plurality of spacer structures 110 is distributed throughout between the bottom layer 108 and surface 132 at locations that are not occupied by conductive traces, electrical components, or other structures on the underside of bottom layer 108 (e.g., the side of bottom layer 108 closest or adjacent to surface 132), as will be described in detail below. The plurality of spacer structures 110 comprises conductive or metallic material. For example, without limitation, spacer structures 110 comprise lead material. Each spacer structure of the plurality of spacer structures 110 is identical or similar to each other in at least height or thickness. In some embodiments, the spacer structures 110 can be identical to each other in shape, size, and composition. Spacer structures 110 may also be referred to as spacers, support structures, conductive structures, or the like.

PCB 112 comprises a transmitter, transmitter panel, receiver, receiver panel, or a portion thereof. PCB 112 includes electrical components, circuitry, or the like to facilitate generation of signals to be provided to antenna module 100 for transmission or to receive signals received by the antenna module 100.

Accordingly, the distance between the antenna layer 102 (and thus the antenna element) and surface 132 of PCB 112 is greater than a distance between the spacer structures 110 and surface 132 of PCB 112, a distance between first and second electrical components 126, 128 and surface 132, or the like.

In some embodiments, if antenna module 100 is associated with a transmitter, a signal pathway 142 within antenna module 100 comprises receiving RF signals from PCB 112 via spacer structure 130 and the signals propagating in conductive trace(s) included in bottom layer 108 to second electrical component 128. If second electrical component 128 comprises a filter, for example, the received signals are converted into filtered signals by the second electrical component 128. The signals outputted by second electrical component 128 propagate along conductive trace(s) included in bottom layer 108 to first electrical component 128. If first electrical component 126 comprises an amplifier, for example, the filtered signals are converted into power amplified signals by the first electrical component 126. The signals outputted by first electrical component 126 propagate along conductive trace(s) included in bottom layer 108, through via 124, to conductive traces included in intermediate layer 106. Signal pathway 142 splits into two branches in intermediate layer 106 so that signals outputted by via 124 are provided to both of vias 120 and 122, which in turn, propagate to both sections 116 and 118 of bottom plate 115. Signals inputted to bottom plate 115 causes radiative coupling with the top plate 111, thereby generating radiation 140 to be emitted from the top side of the antenna module 100.

Conversely, if antenna module 100 is associated with a receiver, signal pathway 142 within antenna module 100 is the reverse of the description above. Namely, radiation 140 detected by the antenna layer 102 is converted into RF signals and sent to first electrical component 126 after propagation through conductive traces in the intermediate layer 106, via 124, and conductive trace(s) included in bottom layer 108. The first electrical component 126 applies low noise amplification to the RF signals to generate amplified RF signals. The amplified RF signals are next processed by the second electrical component 126, such as filtering the amplified RF signals and outputting filtered RF signals. Lastly, the filtered RF signals propagate within conductive trace(s) of bottom layer 108 to PCB 112 via the spacer structure 130.

In some embodiments, in addition to the amplifier differing between the antenna module 100 configured for use with a transmitter versus a receiver (also referred to as transmitter antenna modules and receiver antenna modules), the antenna element shape or antenna type can also be different between the transmitter and receiver antenna modules. Still further, the overall enclosure or package shape of the antenna module can be different between transmitter and receiver antenna modules, the size or dimensions of the transmitter and receiver antenna modules can be different, and/or the like.

For example, without limitation, antenna module 100 configured for use with a transmitter (e.g., first electrical component 126 comprises a PA) can have an overall height or thickness of 4.245 mm, in which a height or thickness from the radiating side of the antenna layer 102 to the underside of the bottom layer 108 is 3.61 mm and the height or thickness of the spacer structures 110 is 0.635 mm. The width and length of the antenna module 100 can be 10 mm by 10 mm. The antenna module 100 configured for use with a receiver (e.g., first electrical component 126 comprises a LNA) is smaller than the antenna module 100 configured for use with a transmitter. Such a receiver antenna module can have an overall height or thickness of 3.265 mm, a height or thickness from the radiating side of the antenna layer 102 to the underside of the bottom layer 108 can be 2.63 mm, the height or thickness of the spacer structures 110 is 0.635 mm, and the width and length can be 8 mm by 8 mm.

In some embodiments, one or more of antenna layer 102, intermediate layer 106, bottom layer 108, spacer structures 110, first electrical component 126, or second electrical component 128 is separately fabricated and then assembled together to form antenna module 100. A plurality of antenna modules or portions thereof can be fabricated on a single wafer, diced or cut into individual antenna modules or portions thereof, individual antenna modules or portions thereof tested for quality control, assembly to complete individual antenna modules (e.g., such as attaching the spacer structures), and then positioning and attaching a plurality of antenna modules to a PCB to form an antenna lattice of a phased array antenna.

Such modular approach to fabricating, testing, and/or locating a plurality of antenna elements and associated components/circuitry of an antenna lattice reduces manufacturing cost, weight, and/or the like. A plurality of antenna structures of an antenna lattice need not be fabricated together on a single board configured in the desired arrangement (e.g., space taper, interspersed, etc.) and then tested, in which individual antenna structures deemed defective are electrically isolated from the antenna lattice and not used. To account for manufacturing variances, a certain number of defective antenna structures, or the like, more than a desired number of antenna structures may need to be fabricated on the single board, which adds to the overall cost and weight. Alternatively, locating the antenna elements as well as the associated components/circuitry of the antenna lattice on top of a board avoids having to locate antenna elements directly on top of a board layer and the remaining components/circuitry of the antenna lattice within the board layer and/or require additional layers in order to satisfy antenna radiative requirements (e.g., certain distance between antenna radiative element and ground plane). The board layer or additional layers may be a special layer that is more expensive than other layers comprising the panel, or the height/thickness of such layer(s) may be (significantly) greater than that of the other layers comprising the panel, contributing to overall weight and size of the panel.

In some embodiments, at least a portion of antenna module 100 (e.g., antenna layer 102, ground plane layer 104, intermediate layer 106, bottom layer 108, first electrical component 126, second electrical component 128, third electrical component, and/or a portion thereof) comprises low signal loss laminate and/or prepreg material having a loss tangent of less than 0.003. Loss tangent may also be referred to as a loss factor, dissipation factor, loss angle, and/or the like. An aperture efficiency (the achieved active element gain compared to the maximum aperture directivity) associated with antenna module 100 is −1 to −2 dB. A phased array antenna including a plurality of antenna modules, in which each antenna module of the plurality of antenna modules comprises an antenna module similar to antenna module 100 and in which each antenna module of the plurality of antenna modules is operated with uniform amplitude excitation of each other, has an aperture efficiency of −1 to −2 dB.

Figure 2A:
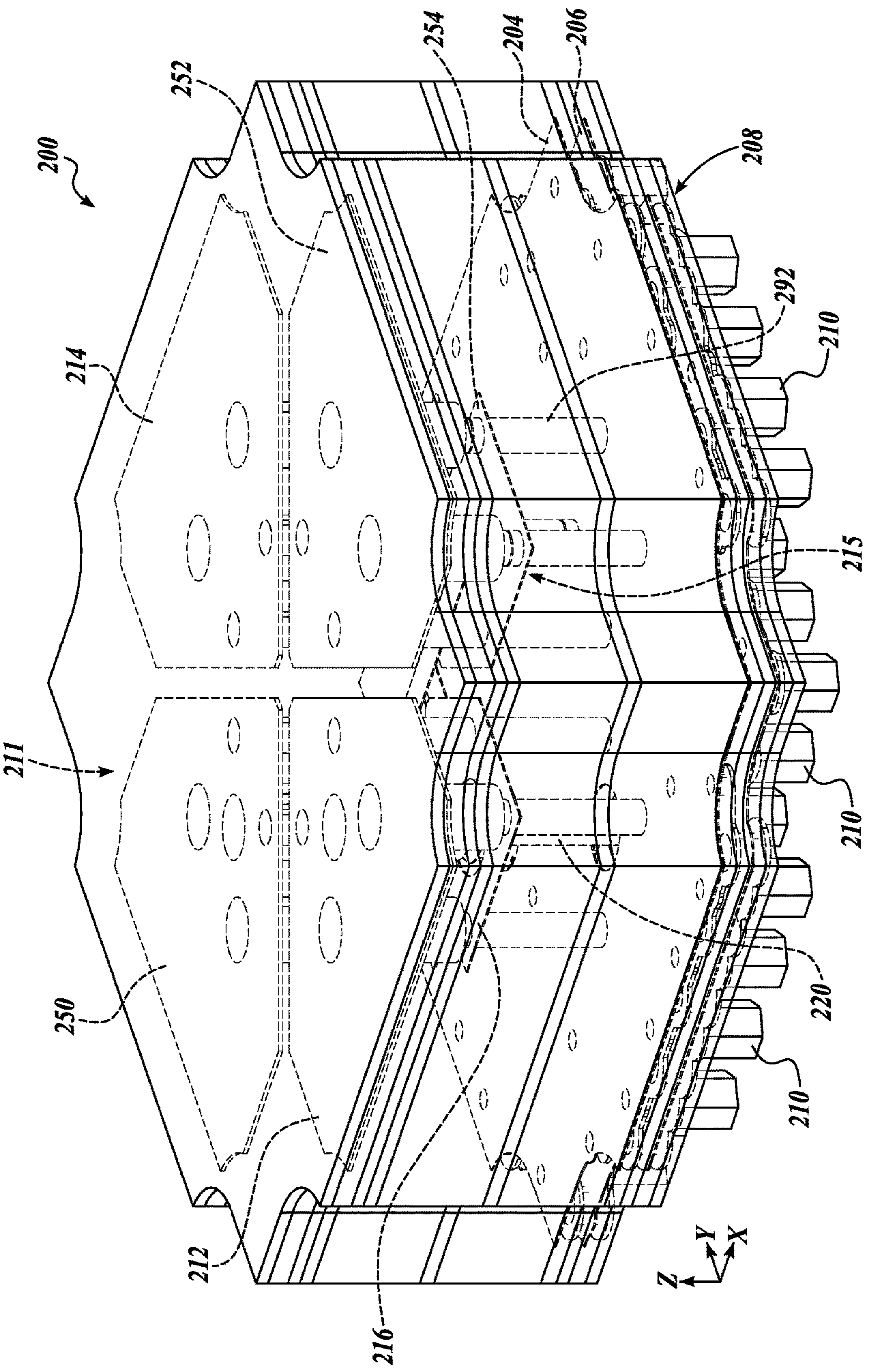
FIGS. 2A-2F are example illustrations of various schematic views of an antenna module in accordance with some embodiments of the present disclosure.
Figure 2B:
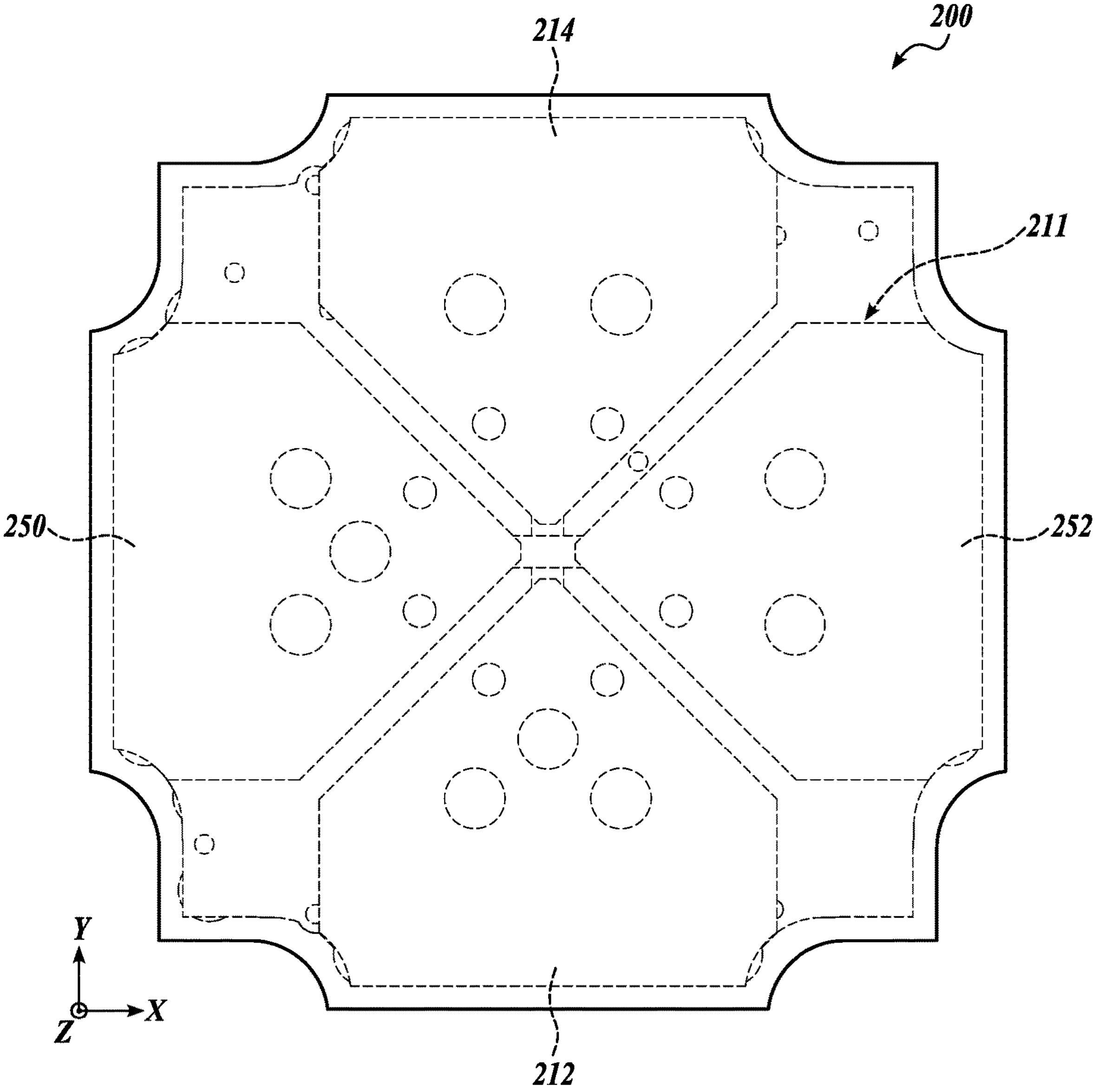
Figure 2C:
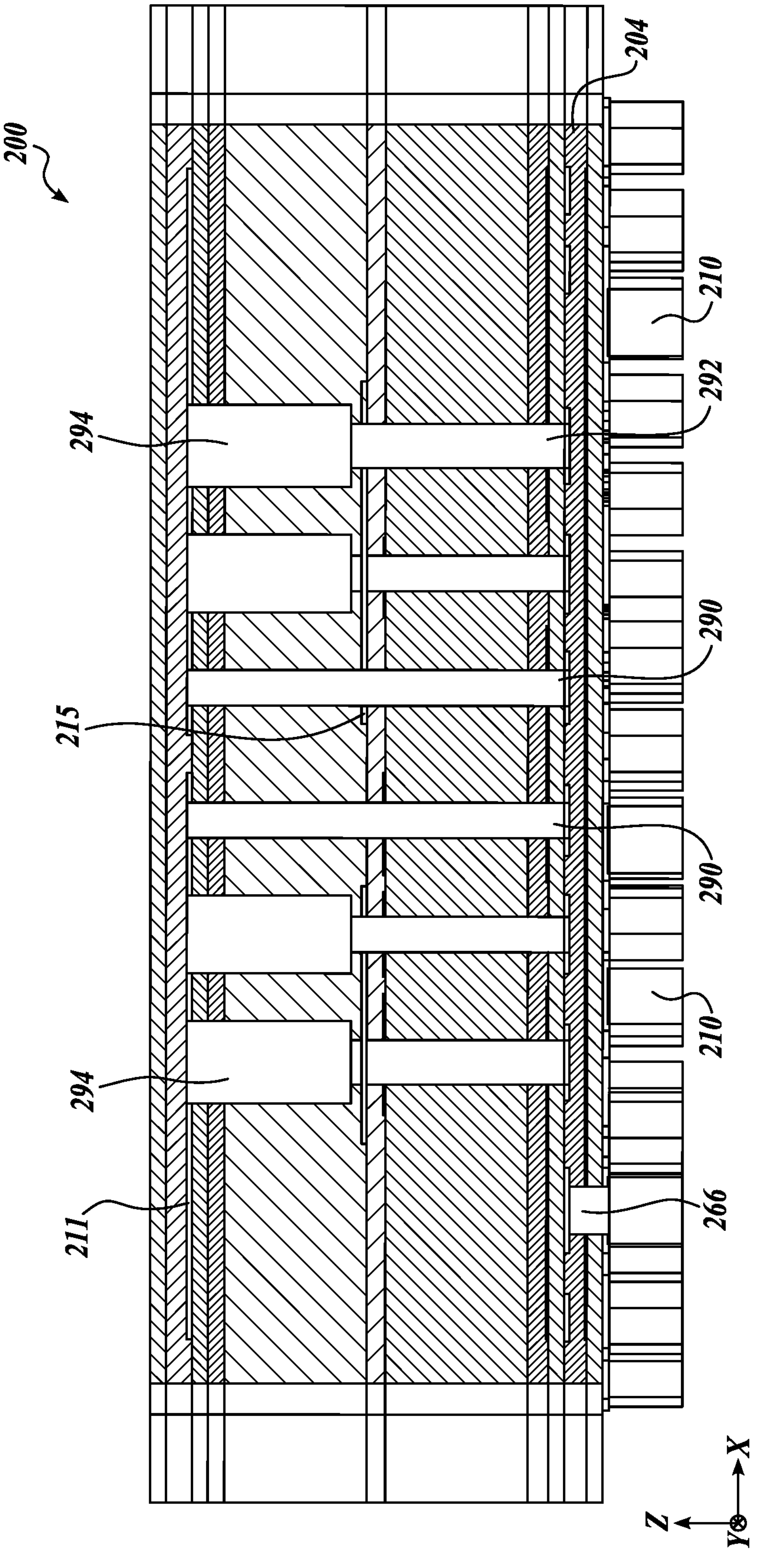
Figure 2D:
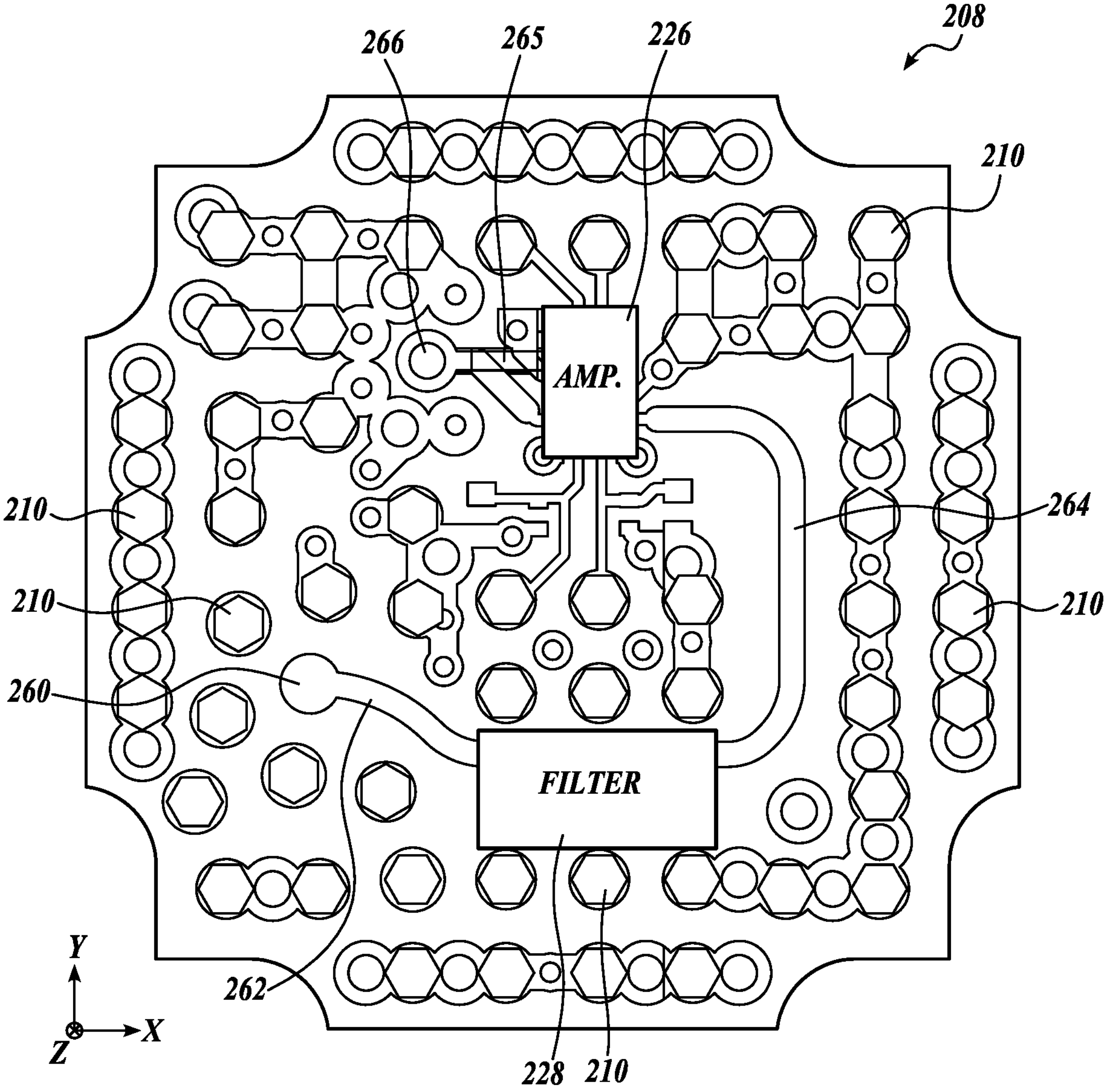
Figure 2E:
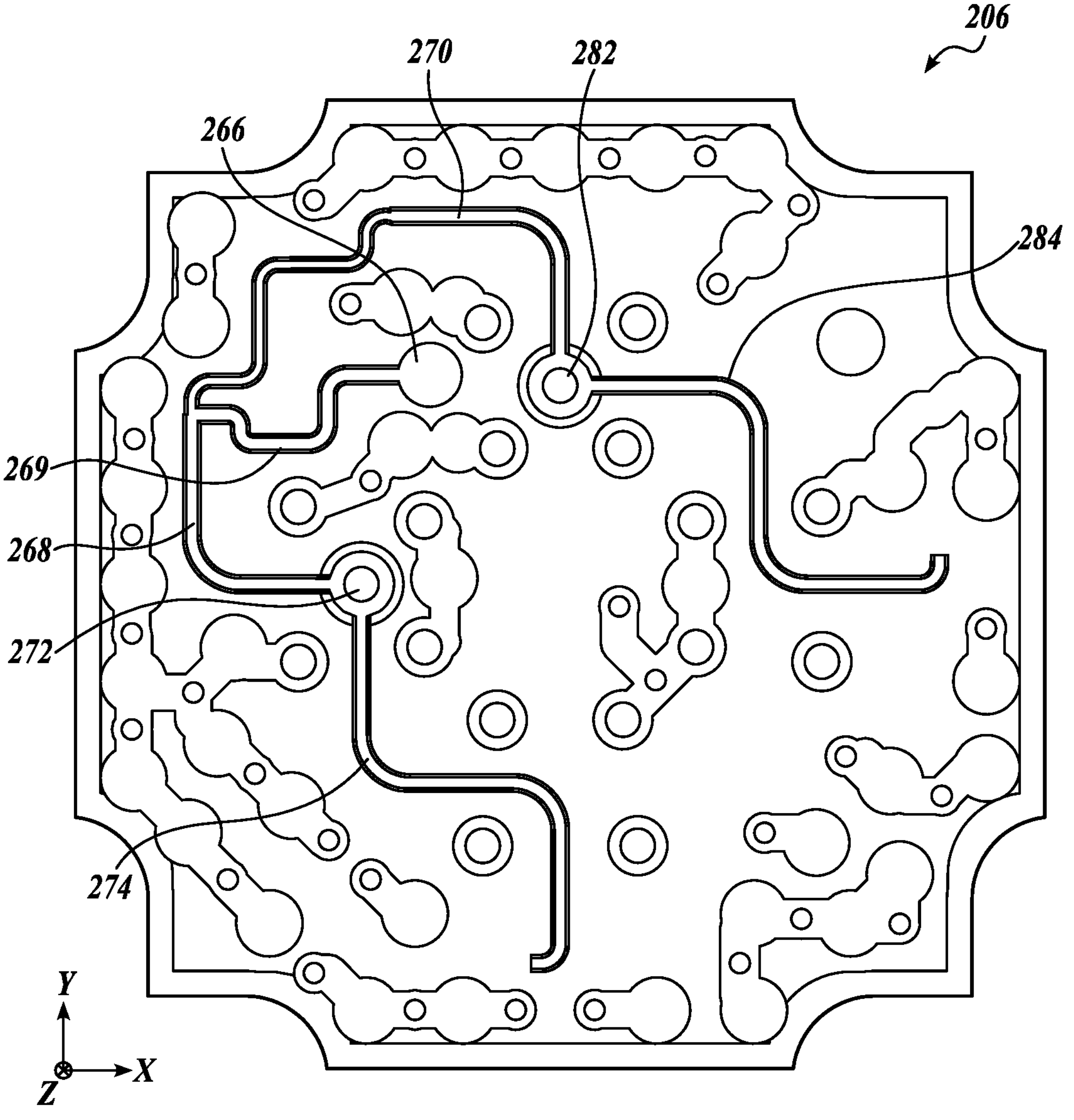

FIGS. 2A-2E are example illustrations of various schematic views of an antenna module 200 in accordance with some embodiments of the present disclosure. FIG. 2A is an example illustration of a perspective view of antenna module 200 in accordance with some embodiments of the present disclosure. FIG. 2B is an example illustration of a top view of antenna module 200 in accordance with some embodiments of the present disclosure. FIG. 2C is an example illustration of a cut away cross-sectional view of antenna module 200 in accordance with some embodiments of the present disclosure. FIG. 2D is an example illustration of a bottom view of a bottom layer 208 of antenna module 200 in accordance with some embodiments of the present disclosure. FIG. 2E is an example illustration of a bottom view of an intermediate layer 206 of antenna module 200 in accordance with some embodiments of the present disclosure.

Antenna module 200 may comprise an example implementation of antenna module 100. Like reference numbers are used in FIGS. 2A-2E for respective similar structures or features as in FIG. 1, except the reference numbers are in the 200 series. For example, a top plate 211 of an antenna element included in antenna module 200 is similar to top plate 111 included in antenna module 100.

Antenna module 200 includes a top plate 211 comprising four sections—sections 212, 214, 250, and 252—that are located in a respective quadrant of a major plane of the top plate 211 (e.g., located in a x-y plane of a Cartesian coordinate system), as shown in FIG. 2B. Sections 212 and 214, located at opposing sides from each other, form a dipole and sections 250 and 252, located at opposing sides from each other, form another dipole. Accordingly, sections 212/214 and sections 250/252 comprise cross-dipoles or dual dipoles. Bottom plate 215 included in antenna module 200 comprises four sections of similar structure also forming cross-dipoles. Sections 216 and 254 shown in FIG. 2A are two of the four sections of bottom plate 215. Section 216 of bottom plate 215 electrically couples with a via 220 that extends through a ground plane layer 204. Section 216 and via 220 are similar to respective section 116 and via 120 shown in FIG. 1. The diameter or width of bottom plate 215 may be smaller than the diameter or width of top plate 211.

A first plurality of conductive vias extends from the top plate 211 to ground plane layer 204. Examples of the first plurality of conductive vias include vias 290 shown in FIG. 2C. A second plurality of conductive vias extends from the bottom plate 215 to ground plane layer 204. Examples of the second plurality of conductive vias include vias 292 shown in FIG. 2C. Vias 292 are formed after back drilled vias 294 (non-conductive and not filled inside) have been formed.

As with the stacked structure comprising antenna module 100, antenna module 200 similarly includes an intermediate layer 206 disposed between ground plane layer 204 and a bottom layer 208. The underside of bottom layer 208 includes a plurality of spacer structures 210. The plurality of spacer structures 210 are distributed throughout the underside of bottom layer 208, as shown in FIG. 2D. Wherever there is space not occupied by conductive traces, electrical components, conductive pads, or other structures, one or more spacer structures 210 can be located.

FIG. 2D shows a signal pathway defined by a conductive termination pad 260 (also referred to as a conductive trace termination, conductive trace termination pad, termination pad, or the like), a conductive trace 262, a filter 228, a conductive trace 264, an amplifier 226, a conductive trace 265, and the via 266, respectively, included at the underside of bottom layer 208 (the side closest or adjacent to a PCB to be attached). Conductive termination pad 260 is configured to electrically couple with a particular spacer structure to be disposed between bottom layer 208 and a PCB. The spacer structure acting as such a conduit may be a spacer structure such as spacer structure 130 of FIG. 1. Conductive termination pad 260 comprises the RF signal input location (also referred to as RF in) of antenna module 200 from the PCB, if the antenna module 200 is associated with a transmitter. Conversely, conductive termination pad 260 comprises the RF signal output location (also referred to as RF out) of antenna module 200 to the PCB, if the antenna module 200 is associated with a receiver.

In the transmitter configuration, RF signal received from the PCB (such as PCB 112) to conductive termination pad 260, via a spacer structure, propagates in conductive trace 262 to filter 228. Filter 228 processes the RF signal and outputs a filtered RF signal that propagates in conductive trace 264 to amplifier 226. Amplifier 226, comprising a PA, applies power amplification to the filtered RF signal, thereby generating an amplified RF signal. The amplified RF signal traverses conductive trace 265 to one end of the via 266. The opposite end of via 266 electrically couples with a conductive trace 269 included in the intermediate layer 206 (see FIG. 2E). Via 266 may be similar to via 124 of FIG. 1.

Amplified RF signal in conductive trace 269 then propagates in each of conductive traces 268 and 270 included in the intermediate layer 206, as shown in FIG. 2E. Conductive traces 268, 270 electrically couples with respective vias 272, 282. Vias 272, 282 comprise the RF feed vias that provide the amplified RF signal to bottom plate 215. The amplified RF signal is then provided to top plate 211 via radiative coupling with bottom plate 215 to be emitted as radiation having a particular configuration. Via 220 of FIG. 2A is one of vias 272 or 282. Vias 272, 282 may be similar to vias 120, 122 of FIG. 1.

Conductive traces 274, 284 extending from respective vias 272, 282 comprise open termination end conductive traces configured to facilitate impedance matching between the two signal pathways or branches after the signal splits. Impedance match is achieved between a first branch beginning at the intersection/junction of conductive traces 269, 268, and 270 and ending at the open termination end of conductive trace 274 and a second branch beginning at the intersection/junction of conductive traces 269, 268, and 270 and ending at the open termination end of conductive trace 284. Conductive traces 274, 284 may also be referred to as tail traces or tail conductive traces.

The signal pathway distance (also referred to as the propagation distance, propagation length, or signal path length) from the RF input of antenna module 200 (e.g., the conductive termination pad 260) to each of the two cross-dipoles of the bottom plate 215 is the same or length matched to each other. Thus, among other things, the propagation length of conductive trace 268 is equal to the propagation length of conductive trace 270, and the height or thickness of via 272 is equal to the height or thickness of via 282.

In a receiver configuration, the signal traversal is in the opposite direction from that described above—starting at top plate 211 to bottom plate 215, through vias 272 and 282, then through via 266, to amplifier 226, then filter 210, to conductive termination pad 260, through a spacer structure, to the PCB. Amplifier 226 would comprise a LNA. In addition to the signal traversal direction being reversed, one or more structures and/or layouts included in the antenna module may differ from that shown in FIGS. 2A-2E. For instance, top and bottom plates 211, 215 may have a different shape as shown in a top view of an antenna module 400 in FIG. 4. The particular layout of electrical components, spacer structures, conductive traces, and/or vias may be different from that shown in FIG. 2D or 2E.

Figure 2F:
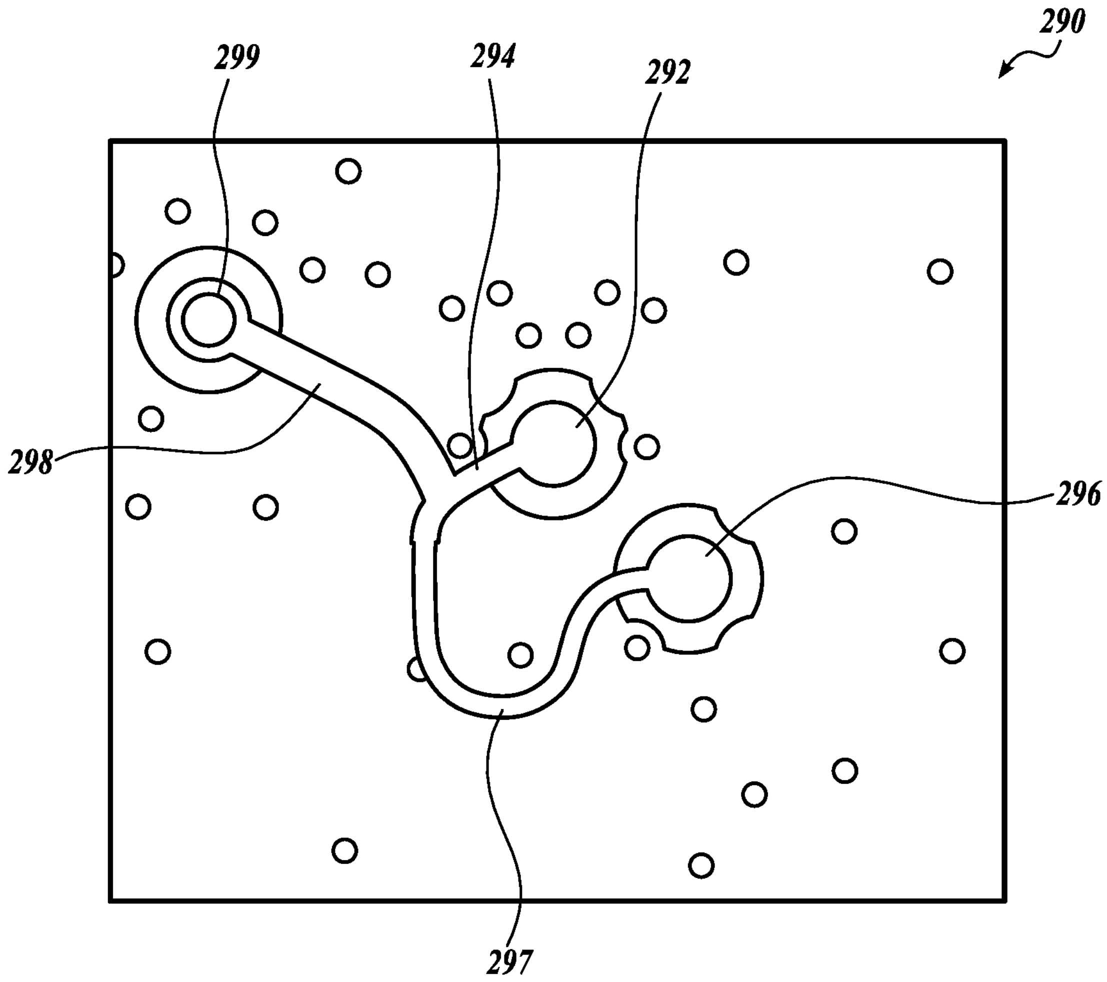

FIG. 2F is an example illustration of a bottom view of an intermediate layer 290 of an antenna module for a receiver in accordance with some embodiments of the present disclosure. In contrast to the intermediate layer 206 shown in FIG. 2E, intermediate layer 290 includes vias 292 and 296 to carry signals outputted by a bottom plate of an antenna element. Vias 292 and 296 are similar to vias 120 and 122. Via 292 electrically couples with a conductive trace 294 and via 296 electrically couples with a conductive trace 297. The opposite ends of each of conductive traces 294, 297 and one end of a conductive trace 298 intersect or electrically couple with each other. The opposite end of conductive trace 298 electrically coupled with a via 299.

A signal propagation length of conductive trace 294 is smaller than a signal propagation length of conductive trace 297. The difference in the signal propagation lengths is selected so as to induce a 90 degree phase delay in the signal outputted from conductive trace 297, relative to the signal outputted from conductive trace 294, at the intersection point of conductive traces 294, 297, 298. The two signals, of which one is 90 degrees phase delayed relative to the other, are combined and traverse conductive trace 298 to be provided to via 299. Via 299 extends through to the bottom layer, and more particularly, provides the combined signal to a LNA provided at the bottom layer. Via 299 is similar to via 124.

While the layouts of intermediate layer 206 for a transmitter and intermediate layer 290 for a receiver are different from each other, each performs the function of appropriately converting a single signal into two signals (or vice versa) and routing signals between the antenna element and the first and second electrical components.

It is contemplated that if the RF input signal has little or no noise such that filtering is not required, filter 210 may be omitted and a different type of electrical component may be provided at that location such as, but not limited to, a second amplifier, a phase shifter, a digital beamformer, and/or the like as discussed above in connection with the third electrical component. As another example, conductive trace 264 in FIG. 2D may be modified to locate a third IC chip (e.g., third electrical component) in the signal pathway between filter 210 and amplifier 226.

Figure 3A:
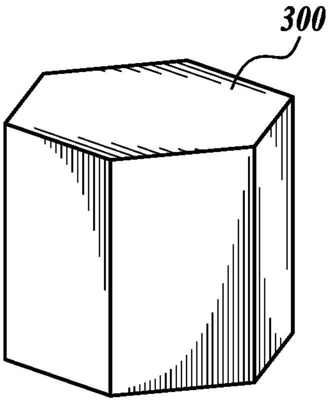
FIGS. 3A-3C are example illustrations of different shapes of spacer structures in accordance with some embodiments of the present disclosure.
Figure 3B:
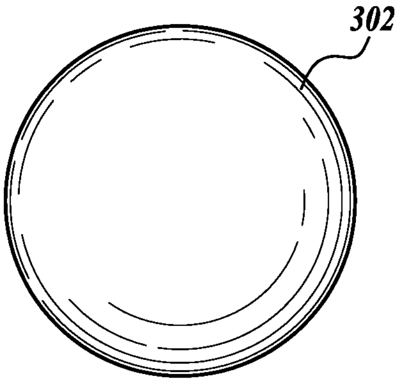
Figure 3C:
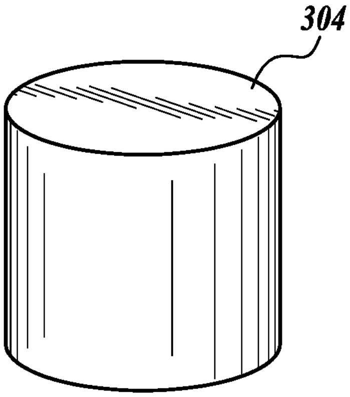

FIGS. 3A-3C are example illustrations of different shapes of spacer structures in accordance with some embodiments of the present disclosure. In FIG. 3A, a spacer structure 300 comprises a multi-sided column or polygonal column such as a column having a pentagon cross-sectional shape. Spacer structure 300 may be similar to spacer structure 210. In FIG. 3B, a spacer structure 302 comprises a spherical shape or substantially a spherical shape in which the top and bottom are flat/planar. For instance, spacer structure 302 can be a solder ball. Spacer structure 302 may be similar to spacer structure 110. In FIG. 3C, a spacer structure 304 comprises a cylindrical column or cylinder. Spacer structures 110 and/or 210 can be a variety of shapes in addition to those shown in FIGS. 3A-3C. For example, without limitation, spacer structures 110 and/or 210 can comprise an oval shape, a cuboid shape, a pyramid shape, or the like.

In some embodiments, the plurality of spacer structures included in an antenna module is of the same height or thickness. One or more spacer structures of the plurality of spacer structures has the same or different shapes from each other. One or more of the spacer structures of the plurality of spacer structures comprises the same or different material from each other, have the same or different conductivity from each other, and/or the like.

Figure 4A:
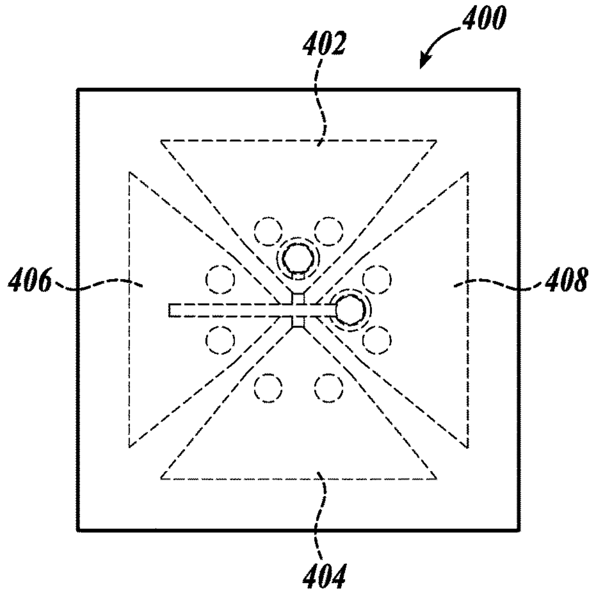
FIGS. 4A-4D are example illustrations of top views of various antenna modules in accordance with some embodiments of the present disclosure.
Figure 4B:
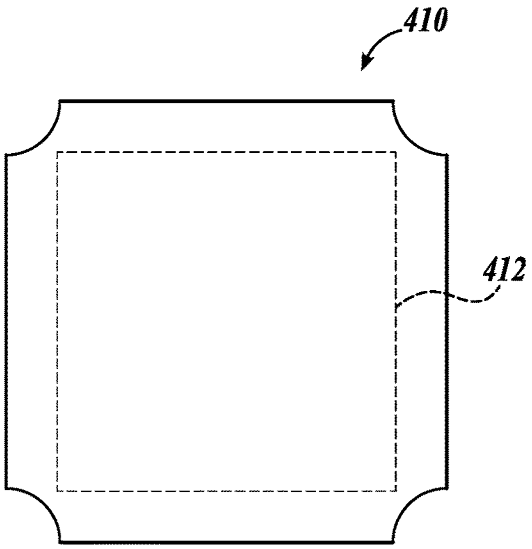
Figure 4C:
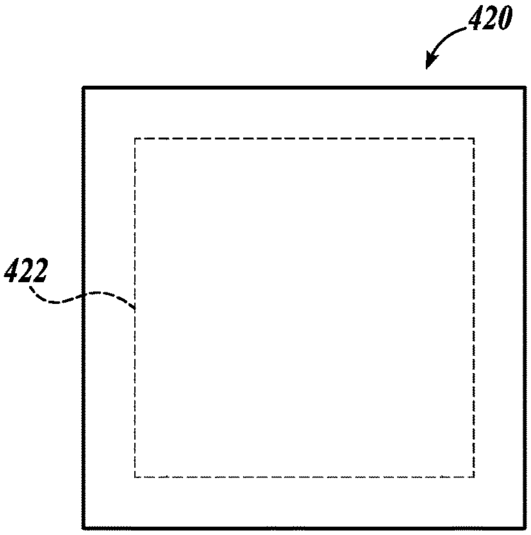
Figure 4D:
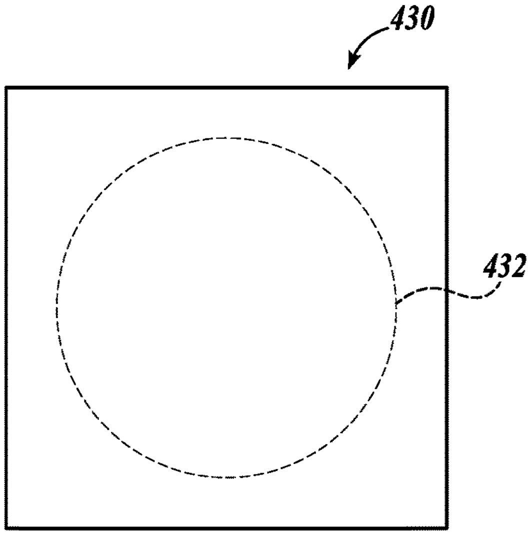

FIGS. 4A-4D are example illustrations of top views of various antenna modules in accordance with some embodiments of the present disclosure. Top and bottom plates of the antenna element included in an antenna module can be any of a variety of shapes. In FIG. 4A, a top view of an antenna module 400 is shown, in which a top plate of the antenna element included in the antenna module 400 comprises cross-dipoles. Although the top plate comprises four sections—sections 402, 404, 406, and 408—arranged in respective quadrants of a major plane of the top plate, similar to top plate 211 in FIG. 2B, the shape of each of the sections 402-408 is different from sections 212, 214, 250, 252 of top plate 211. While each of sections 212, 214, 250, 252 comprises substantially a five-sided polygonal shape, each of sections 402-408 comprises a triangular shape. In FIGS. 4B and 4C, top plates 412, 422 of respective antenna modules 410, 420 comprise a square shape. In FIG. 4D, a top plate 432 of an antenna module 430 comprises a circular shape.

An antenna module includes an outer enclosure or package. The shape of the outer enclosure or package can be any of a variety of shapes. For example, in FIGS. 4A and 4C-4D, the outer enclosure or package of respective antenna modules 400, 420, 430 comprises a polygon such as a square shape. In FIG. 4B, the outer enclosure or package of antenna module 410 comprises a modified polygon such as a square shape with chamfered corners. In FIG. 2A, the outer enclosure or package of antenna module 200 comprises a square shape with multi-chamfered corners (e.g., two concavity, indentations, or bevels per corner).

Figure 5A:
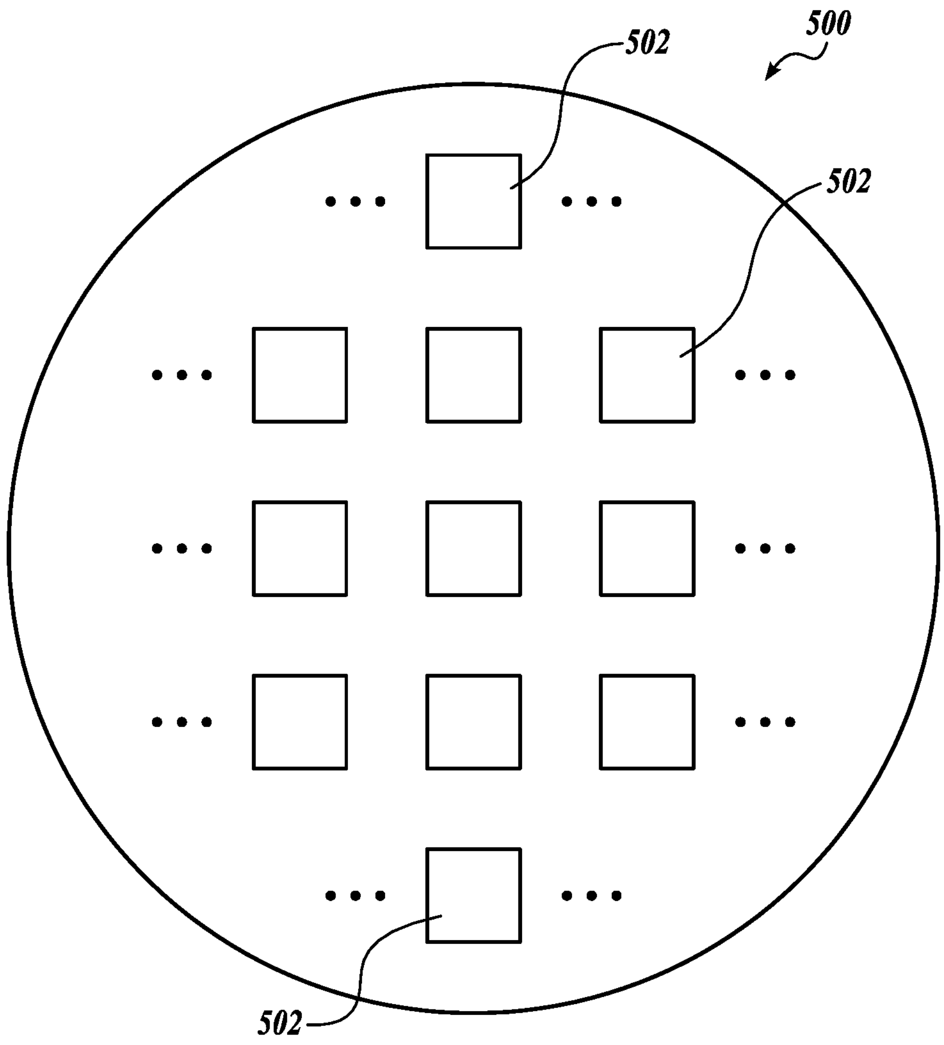
FIG. 5A is an example illustration of a top view of an antenna lattice in accordance with some embodiments of the present disclosure.

FIG. 5A is an example illustration of a top view of an antenna lattice 500 in accordance with some embodiments of the present disclosure. Antenna lattice 500 includes a plurality of antenna modules 502 configured in a particular arrangement. Each of the antenna modules 502 can comprise the antenna module 100 or 200. An antenna aperture (also referred to as an aperture) is associated with antenna lattice 500. The antenna aperture is the area through which power is radiated by the antenna modules 502.

Figure 5B:
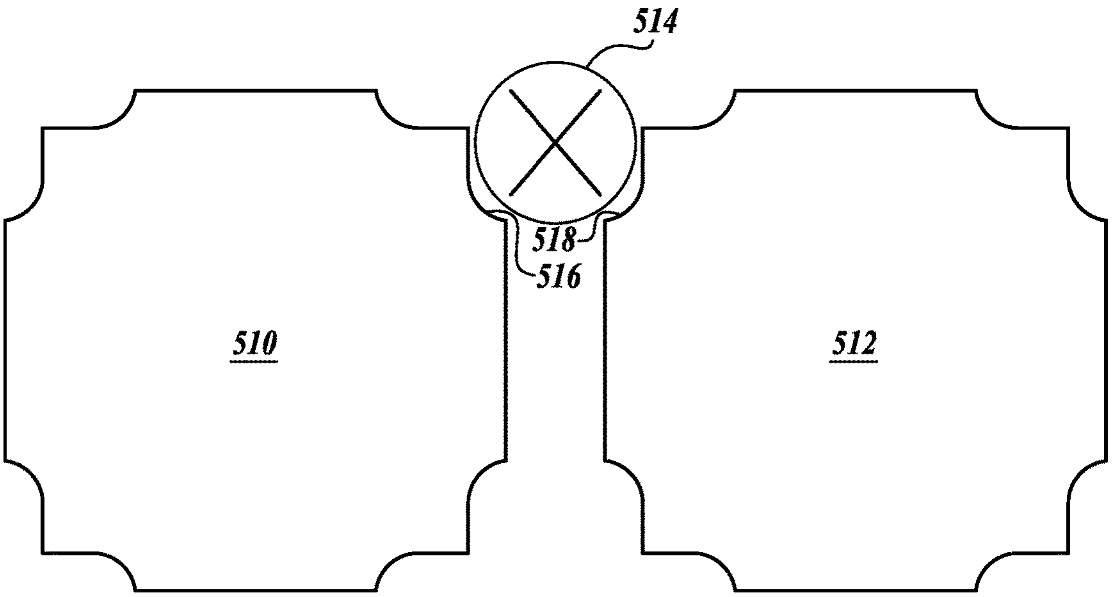
FIG. 5B is an example illustration of a top view of a portion of the antenna lattice in accordance with some embodiments of the present disclosure.

Depending on how close adjacent antenna modules 502 are located relative to each other, inclusion of other structures in the antenna lattice 500, and/or other antenna lattice requirements, the shape of the outer enclosure or package of the antenna modules 502 may be particularly selected to facilitate such requirements. FIG. 5B is an example illustration of a top view of a portion of the antenna lattice 500 in accordance with some embodiments of the present disclosure. The plurality of antenna modules 502 includes antenna modules 510 and 512 located next to each other. In some embodiments, one or more fasteners 514 (e.g., a screw) is used to physically attach the antenna lattice 500 to other structure(s) of the phased array antenna system. In order to locate antenna modules 510 and 512 at a particular distance from each other and also have sufficient space for the one or more fasteners 514, the outer enclosure or package of the antenna modules 510 and 512 are designed to have a particular shape or contours. At least portions 516, 518 of the outer enclosures or packages of respective antenna modules 510, 512 closest to the one or more fasteners 514 are particularly shaped to leave sufficient space for the one or more fasteners 514. Antenna modules 510, 512 have a similar outer enclosure shape as the antenna module 100.

Figure 6:
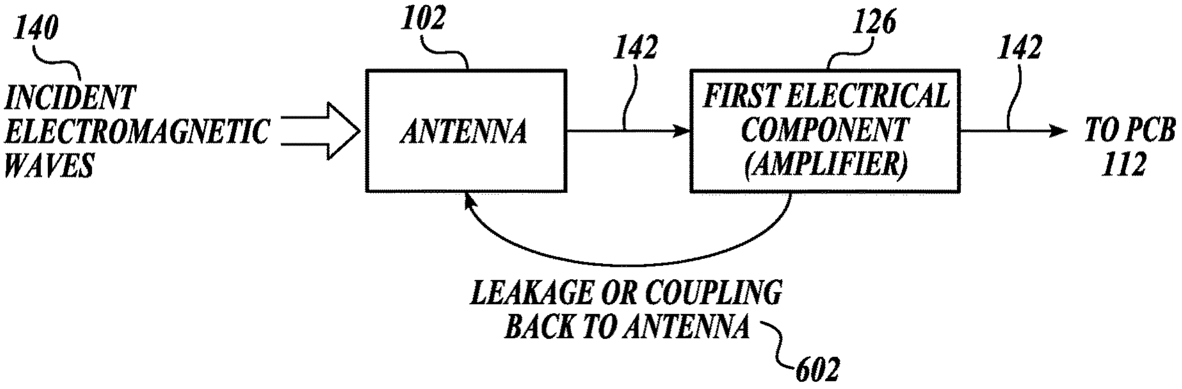
FIG. 6 is an example illustration of a block diagram showing a signal leakage or coupling loop associated with an antenna module according to some embodiments of the present disclosure.

FIG. 6 is an example illustration of a block diagram showing a signal leakage or coupling loop associated with an antenna module 100 according to some embodiments of the present disclosure. In some embodiments, first electrical component 126 of antenna module 100 is configured to provide a gain in the range of approximately 25 dB to incident electromagnetic waves received by the antenna layer 102 (e.g., radiation 140). In some cases, in addition to such received signal propagating along signal pathway 142 from the antenna element included in the antenna layer 102 to PCB 112, signal leakage or coupling 602 may also occur from first electrical component 126 back to the antenna included in antenna layer 102. Signal leakage or coupling 602 may cause a closed loop to be created comprising an infinite cycle of amplification. Sufficient amplification, in turn, may result in generation of undesirable oscillation for antenna module 100.

At least a subset of the plurality of spacer structures 110 provides shielding (e.g., approximates a Faraday cage) to reduce, minimize, block, eliminate, or otherwise address the signal leakage or coupling 602. The subset of the plurality of spacer structures 110 are configured to cause the coupling 602 to be less than the amount of gain provided by the first electrical component 126. The subset of the plurality of spacer structure 110 similarly provide shielding to reduce signal leakage or coupling that can occur with the antenna module 100 operating in a transmitter configuration (e.g., signal propagation from PCB 112 to antenna element of antenna layer 102).

In this manner, a vertical spacing or cavity defined by at least a subset of the plurality of spacer structures 110 between the underside of bottom layer 108 and surface 132 of PCB 112 provides space to locate first and second electrical components 126, 128 within the antenna module 100 without causing them to be damaged when the antenna module 100 is secured to PCB 132. A signal pathway length between the first and second electrical components 126, 128 and the antenna element of the antenna module 100 is reduced by packaging the electrical components 126, 128 with the antenna element, rather than locating the electrical components 126, 128 in PCB 112 or some other external structure. A particular one of the spacer structure of the plurality of spacer structures 110 (e.g., spacer structure 130) serves as an electrical coupling structure or mechanism between the antenna module 100 and PCB 112 without the need to define a via or other dedicated structure.

In some embodiments, the antenna modules disclosed herein can be included in a communications system, a wireless communications system, a satellite-based communications system, a terrestrial-based communications system, a non-geostationary (NGO) satellite communications system, a low Earth orbit (LEO) satellite communications system, one or more communication nodes of a communications system (e.g., satellites, user terminals associated with user devices, gateways, repeaters, base stations, etc.), and/or the like.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The embodiments of the invention in which an exclusive property or privilege is claimed are defined as follows:

1. An apparatus comprising:

a plurality of conductive structures having first sides and second sides opposite the first sides, wherein the second sides of the plurality of conductive structures are configured to be physically coupleable with a printed circuit board (PCB) of a receiver, a transmitter, or a transceiver and wherein the first sides of the plurality of conductive structures are configured to be spaced from the PCB by a first distance when the plurality of conductive structures is physically coupled with the PCB; and an antenna having a first side and a second side opposite the first side, wherein second side of the antenna is disposed closer to the plurality of conductive structures than the first side of the antenna when the plurality of conductive structures is physically coupled with the PCB.

2. The apparatus of claim 1, wherein the second side of the antenna is configured to be spaced from the PCB by a second distance greater than the first distance.

3. The apparatus of claim 1, wherein the first distance is equal to a height of a cavity defined by a subset of the plurality of conductive structures when the plurality of conductive structures is physically and electrically coupled with the PCB.

4. The apparatus of claim 3, further comprising an amplifier electrically coupled with the antenna and wherein the amplifier is located within the cavity.

5. The apparatus of claim 4, further comprising one of a filter, a phase shifter, a digital beamformer, a switch to select between transmitter or receiver operation, an up converter, a down converter, a mixer, an analog-to-digital converter (ADC), or a digital-to-analog converter (DAC) located within the cavity.

6. The apparatus of claim 3, further comprising an amplifier and a filter located within the cavity, and wherein the amplifier electrically couples with the antenna and the filter electrically couples with the amplifier and the PCB.

7. The apparatus of claim 1, further comprising first and second active electrical components spaced at the first distance from the PCB when the plurality of conductive structures is physically coupled with the PCB.

8. The apparatus of claim 7, further comprising one or more layers disposed between the antenna and the plurality of conductive structures, the one or more layers including one or both of a conductive trace or a conductive via to route radio frequency (RF) signals between the antenna and the PCB when the plurality of conductive structures is physically coupled with the PCB, and wherein a particular conductive structure of the plurality of conductive structures routes the RF signals to or from the PCB.

9. The apparatus of claim 8, wherein the first active electrical component comprises an amplifier electrically coupled with the antenna and the second active electrical component comprises a filter electrically coupled between the first active electrical component and the particular conductive structure.

10. The apparatus of claim 1, wherein a conductive structure of the plurality of conductive structures has a spherical shape, has a columnar shape, or is a solder ball.

11. The apparatus of claim 1, further comprising an amplifier electrically coupled with the antenna and spaced at the first distance from the PCB, and wherein a signal pathway length between the antenna and the amplifier is 0.5 millimeter (mm) or less, approximately 0.25 mm, less than 2 mm, or less than 5 mm.

12. The apparatus of claim 1, wherein the apparatus is included in an antenna lattice of a phased array antenna, wherein the PCB is associated with the antenna lattice, and wherein the apparatus is configured to be particularly located on and selectively physically decoupleable from the PCB.

13. The apparatus of claim 1, further comprising one or more layers disposed between the antenna and the plurality of conductive structures, and wherein the one or more layers comprises laminate or prepreg material having a loss tangent of less than 0.003.

14. An antenna module comprising:

an antenna element having a first side and a second side opposite the first side; and a plurality of structures configured to be physically and electrically coupleable with a PCB of a receiver, a transmitter, or a transceiver wherein at least a subset of the plurality of structures define a cavity, and wherein a particular structure of the plurality of structures comprises an electrical connection between the PCB and the antenna module when the plurality of structures is physically coupled with the PCB.

15. The antenna module of claim 14, wherein at least one structure of the plurality of structures is configured to reduce signal leakage between the antenna element and the cavity.

16. The antenna module of claim 14, wherein the plurality of structures is physically and electrically coupleable or decoupleable from the antenna module.

17. The antenna module of claim 14, wherein the plurality of structures have first sides and second sides opposite to the first sides, wherein the plurality of structures is spaced a first distance from the PCB when the plurality of structures is physically coupled with the PCB, wherein the second side of the antenna element is spaced a second distance from the PCB when the plurality of structures is physically coupled with the PCB, and wherein the second distance is greater than the first distance.

18. The antenna module of claim 17, wherein the first distance, a height of the cavity, and a height of the plurality of structures are equal to each other.

19. The antenna module of claim 14, further comprising one or more layers disposed between the antenna element and the plurality of structures, wherein the one or more layers includes one or both of a conductive trace or a conductive via to route radio frequency (RF) signals between the antenna element and the PCB when the plurality of structures is physically coupled with the PCB.

20. The antenna module of claim 19, wherein each structure of the plurality of structures is physically and electrically coupled with the one or more layers at a location not occupied by the conductive trace or the conductive via.

21. The antenna module of claim 14, wherein at least a subset of the plurality of structures is configured to reduce signal leakage or coupling between the antenna element and the cavity.

22. An antenna module included in a phased array antenna, the antenna module comprising:

an antenna element having a radiating side;

a plurality of structures configured to be physically and electrically coupleable with a PCB of a receiver, a transmitter, or a transceiver wherein at least a subset of the plurality of structures define a cavity, wherein a particular structure of the plurality of structures comprises an electrical coupling structure between the PCB and the antenna element, and wherein the plurality of structures is disposed between the antenna element and the PCB; and a via electrically coupled between the antenna element and the PCB, wherein the via and the particular structure define a signal path between the antenna element and the PCB.

23. The antenna module of claim 22, further comprising an additional via electrically coupled between the antenna element and the PCB, wherein the additional via is configured to reduce signal leakage between the antenna element and the cavity.

24. The antenna module of claim 23, wherein the phased array antenna includes a plurality of antenna modules, wherein each antenna module of the plurality of antenna modules is operated with uniform amplitude excitation of each other.

* * * * *